(12) United States Patent
Beck et al.

(10) Patent No.: US 11,529,704 B2
(45) Date of Patent: Dec. 20, 2022

(54) DEVICE AND METHOD FOR ANALYZING THE SURFACE OF PARTS HAVING COOLING FLUID OPENINGS

(71) Applicant: Siemens Aktiengesellschaft, Munich (DE)

(72) Inventors: Thomas Beck, Panketal (DE); Jens Dietrich, Falkensee (DE); Oliver Katzurke, Berlin (DE); Marcel Krügerke, Wandlitz (DE); Andrea Massa, Berlin (DE); Richard Zimmermann, Berlin (DE); Sven Kreuziger, Aachen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/251,783

(22) PCT Filed: Jul. 5, 2019

(86) PCT No.: PCT/EP2019/068127
§ 371 (c)(1),
(2) Date: Dec. 12, 2020

(87) PCT Pub. No.: WO2020/011673
PCT Pub. Date: Jan. 16, 2020

(65) Prior Publication Data
US 2021/0207484 A1     Jul. 8, 2021

(30) Foreign Application Priority Data

Jul. 9, 2018 (DE) .................... 10 2018 211 288.6

(51) Int. Cl.
*B23P 6/00* (2006.01)
*F01D 5/00* (2006.01)
(Continued)

(52) U.S. Cl.
CPC .............. *B23P 6/002* (2013.01); *B23P 15/02* (2013.01); *F01D 5/005* (2013.01); *F01D 5/186* (2013.01);
(Continued)

(58) Field of Classification Search
CPC ......... B23P 16/002; B23P 15/02; F01D 5/186
See application file for complete search history.

(56) References Cited

U.S. PATENT DOCUMENTS 4,176,433 A * 12/1979 Lee .......................... B23P 6/002
427/104
4,334,495 A * 6/1982 Derkacs .................... F01D 5/30
118/712

(Continued)

FOREIGN PATENT DOCUMENTS

CA     2414019 A1    6/2003
EP     0486489 B1   11/1994
(Continued)

OTHER PUBLICATIONS

PCT International Search Report and Written Opinion of International Searching Authority dated Oct. 18, 2019 corresponding to PCT International Application No. PCT/EP2019/068127 filed May 7, 2019.

*Primary Examiner* — Jason L Vaughan
(74) *Attorney, Agent, or Firm* — Wolter Van Dyke Davis, PLLC

(57) ABSTRACT

A method for coating a part having a surface that has cooling fluid openings that adjoin cooling fluid ducts inside the part. A device analyzes the surface of a part having a surface that has cooling fluid openings which adjoin cooling fluid ducts inside the part, the device being usable in the aforemen-
(Continued)

tioned method. The disclosed device and/or the disclosed method is used during the manufacturing and/or overhauling of parts of a turbomachine.

18 Claims, 2 Drawing Sheets

(51) Int. Cl.
| | |
|---|---|
| *F01D 5/18* | (2006.01) |
| *F01D 5/28* | (2006.01) |
| *F01D 9/06* | (2006.01) |
| *F23R 3/06* | (2006.01) |
| *G01B 11/24* | (2006.01) |
| *G01B 11/245* | (2006.01) |
| *B23P 15/02* | (2006.01) |

(52) U.S. Cl.
CPC ............ *F01D 5/288* (2013.01); *F01D 9/065* (2013.01); *F23R 3/06* (2013.01); *G01B 11/24* (2013.01); *G01B 11/245* (2013.01); *G01B 11/2441* (2013.01); *B23P 2700/06* (2013.01); *F05D 2240/81* (2013.01); *F05D 2260/202* (2013.01); *F23R 2900/00019* (2013.01); *F23R 2900/03042* (2013.01); *Y10T 29/49341* (2015.01)

(56) References Cited

U.S. PATENT DOCUMENTS

| | | | |
|---|---|---|---|
| 5,154,885 A | 10/1992 | Czech et al. | |
| 5,216,808 A * | 6/1993 | Martus | B23K 26/0622 |
| | | | 29/889.71 |
| 5,773,790 A * | 6/1998 | Moore | G01N 21/8803 |
| | | | 219/121.71 |
| 5,993,980 A | 11/1999 | Schmitz et al. | |
| 6,024,792 A | 2/2000 | Kurz et al. | |
| 6,231,692 B1 | 5/2001 | Vogt et al. | |
| 6,380,512 B1 * | 4/2002 | Emer | F01D 5/005 |
| | | | 219/121.85 |
| 6,524,395 B1 * | 2/2003 | Devine, II | C23C 4/00 |
| | | | 134/22.12 |
| 6,723,951 B1 * | 4/2004 | McGraw | B23K 26/04 |
| | | | 219/121.71 |
| 7,329,832 B2 * | 2/2008 | Hoebel | B23K 26/382 |
| | | | 219/121.71 |
| 7,333,218 B2 * | 2/2008 | Vaidyanathan | G06V 30/144 |
| | | | 382/152 |
| 7,388,980 B2 * | 6/2008 | Vaidyanathan | F01D 5/005 |
| | | | 382/152 |
| 7,578,178 B2 * | 8/2009 | Boyer | F01D 25/285 |
| | | | 73/112.01 |
| 8,212,179 B2 * | 7/2012 | Luketic | B23K 26/384 |
| | | | 219/121.7 |
| 8,699,037 B2 * | 4/2014 | Cox | G01N 3/42 |
| | | | 356/600 |
| 9,403,245 B2 * | 8/2016 | Arjakine | F01D 5/005 |
| 9,707,645 B2 | 7/2017 | Ozturk et al. | |
| 10,815,796 B2 * | 10/2020 | Burd | F01D 5/186 |
| 2002/0076097 A1 | 6/2002 | Vaidyanathan | |
| 2002/0157738 A1 | 10/2002 | Buergel et al. | |
| 2003/0207151 A1 | 11/2003 | Stamm | |
| 2004/0011439 A1 | 1/2004 | Corrigan et al. | |
| 2006/0113009 A1 | 6/2006 | Buergel et al. | |
| 2006/0157456 A1 * | 7/2006 | Hoebel | B23K 26/389 |
| | | | 219/121.71 |
| 2006/0291716 A1 | 12/2006 | Vaidyanathan | |
| 2009/0297336 A1 * | 12/2009 | Allen | G01F 1/68 |
| | | | 702/49 |
| 2010/0068032 A1 * | 3/2010 | Liang | F01D 5/186 |
| | | | 415/115 |
| 2012/0268747 A1 | 10/2012 | Bostanjoglo | |
| 2013/0163849 A1 * | 6/2013 | Jahnke | G06T 7/11 |
| | | | 382/141 |
| 2013/0180108 A1 | 7/2013 | Arjakine | |
| 2013/0215260 A1 * | 8/2013 | Drescher | G01N 21/8806 |
| | | | 348/92 |
| 2014/0300728 A1 * | 10/2014 | Drescher | G01N 21/9515 |
| | | | 348/92 |
| 2015/0160644 A1 | 6/2015 | Reid et al. | |
| 2016/0186626 A1 | 6/2016 | Bunker | |
| 2016/0348512 A1 | 12/2016 | Miranda et al. | |

FOREIGN PATENT DOCUMENTS

| | | |
|---|---|---|
| EP | 0412397 B1 | 3/1998 |
| EP | 0892090 A1 | 1/1999 |
| EP | 0786017 B1 | 3/1999 |
| EP | 1306454 A1 | 5/2003 |
| EP | 1319729 A1 | 6/2003 |
| EP | 1204776 B1 | 6/2004 |
| EP | 1510283 A1 | 3/2005 |
| EP | 1739409 A1 | 1/2007 |
| EP | 2845918 A1 | 3/2015 |
| EP | 2598835 B1 | 7/2015 |
| EP | 3040514 A1 | 7/2016 |
| WO | 9102108 A1 | 11/1994 |
| WO | 9967435 A1 | 12/1999 |
| WO | 0044949 A1 | 8/2000 |
| WO | 2011045343 A1 | 4/2011 |
| WO | 2011047995 A1 | 4/2011 |

* cited by examiner

DEVICE AND METHOD FOR ANALYZING THE SURFACE OF PARTS HAVING COOLING FLUID OPENINGS

CROSS REFERENCE TO RELATED APPLICATIONS

This application is the US National Stage of International Application No. PCT/EP2019/068127 filed 5 Jul. 2019, and claims the benefit thereof. The International Application claims the benefit of German Application No. DE 10 2018 211 288.6 filed 9 Jul. 2018. All of the applications are incorporated by reference herein in their entirety.

FIELD OF INVENTION

The present invention relates to a process for the surface analysis of the abovementioned components. Furthermore the present invention relates to an apparatus for the surface analysis of components which have cooling fluid openings on their surface, where the abovementioned cooling fluid openings have to be opened again in a defined manner after a subsequent coating step. The present invention further relates to the use of the abovementioned apparatus in the production or refurbishment of components of a turbo machine. The invention further relates to the use of the information obtained by means of the apparatus of the invention and/or the information obtained by means of the process of the invention in the production of a model of the component or the correction of an existing model of the component.

BACKGROUND OF INVENTION

Mechanically highly stressed components which are exposed to a hot and corrosive medium, for example turbine blades or other turbine components, are frequently made of superalloys having a high hot strength and are additionally provided with expensive corrosion- and/or oxidation-inhibiting coatings and/or thermal barrier coatings. In addition, such components are typically provided with internal cooling fluid channels by means of which cooling fluid, for example a gas such as air, can be conveyed through the component in order to quickly remove heat taken up. When, in addition, a cooling fluid film is to be created over the surface of the component so that the surface is not exposed directly to the hot and corrosive medium, the components have cooling fluid openings through which the cooling fluid is blown out from the interior of the component.

During application of a coating to a component provided with cooling fluid openings, the cooling fluid openings are at least partly closed by the coating material. For this reason, they have to be opened again after conclusion of the coating process. This can, for example, occur by particular cooling fluid openings being chosen as reference openings and then being closed by means of a masking material to which the coating material does not adhere regularly before the coating process. After coating, the masking material in the reference openings is then either manually removed or burnt out if burning out of the masking material is employed. Subsequently, the position of the remaining cooling fluid openings is determined with the aid of the position of the reference openings. The further cooling fluid openings are, for example, opened again by means of a laser program. However, a problem here is that, even when the construction data for the component are available, deviations in respect of the position and orientation of the further cooling fluid channels and cooling fluid openings can occur. This is attributable to, for example, different tolerances of different manufacturers. Furthermore, a change in the geometry of the component can occur during operation of the components. It is therefore not possible to rely entirely on the construction data in the refurbishment of previously used components. In addition, human error, for example, in mistaking two components which superficially appear identical but have minimal differences in respect of the construction should never be ruled out entirely.

However, existing processes and apparatuses give either too little and/or too inaccurate information in order to ensure precise removal of the applied coating from the cooling fluid openings on the surface with sufficient reliability, or it can be that the measurements are too time-consuming or inflexible to be feasibly used in a real industrial process.

Particularly in the case of maintenance of turbo machines, appropriate maintenance operations have to be carried out very quickly but without failing to take into account the required precision, since corresponding delays can lead to high additional costs or even damage.

There is thus a need to provide a process by means of which such a coating step with subsequent opening of appropriate cooling fluid openings can be simplified and/or accelerated. Furthermore, there is a need for an apparatus which makes such a process possible.

SUMMARY OF INVENTION

These objects are achieved by the process, the apparatus and the use as set forth in the independent claims. The dependent claims contain advantageous embodiments of the invention which provide further advantages which can also solve additional problems.

In one aspect, the present invention provides a process for coating a component comprising a surface comprising cooling fluid openings which adjoin cooling fluid channels in the interior of the component, wherein the process comprises the following steps: a) introduction of the component into an apparatus for the surface analysis of the component, where the apparatus comprises at least one measuring device and at least one fastening for the component, where the fastening is suitable for being connected detachably either directly or indirectly to the component, where the apparatus is suitable for carrying out a two-part surface analysis, where the position of the cooling fluid openings on the surface of the component is determined in one part of the surface analysis and where the three-dimensional shape of at least one cooling fluid opening is determined in another part of the surface analysis, where at least one element from the group consisting of the at least one measuring device and the at least one fastening is movable, b) carrying out of the surface analysis of the component, where data in respect of the position of the cooling fluid openings on the surface of the component and in respect of the three-dimensional shape of at least one cooling fluid opening are obtained, c) application of a coating to the component, where the cooling fluid openings are at least partly, advantageously completely, closed, d) removal of the coating in the region of the cooling fluid openings.

The process of the invention surprisingly allows, in particular, the automatic provision of the data in respect of the exact position of the cooling fluid openings of the component after application of a coating to these cooling fluid openings, as are required for processing. Here, it was found that such a two-part process for surface analysis, for example using various measuring devices or the same measuring device at different times with, in particular, different resolution makes it possible to obtain sufficient data to allow automated and highly precise reopening of the cooling fluid channels.

In a further aspect, the present invention provides an apparatus for the surface analysis of a component comprising a surface comprising cooling fluid openings which adjoin cooling fluid channels in the interior of the component, wherein the apparatus comprises at least one measuring device and at least one fastening for the component, where the fastening is suitable for being joined directly or indirectly to the component, where the apparatus is suitable for carrying out a two-surface surface analysis, where the position of the cooling fluid openings on the surface of the component is determined in one part of the surface analysis and the three-dimensional shape of at least one cooling fluid opening is determined in another part of the surface analysis, where at least one element from the group consisting of the at least one measuring device and the at least one fastening is movable. For example, the measuring device for determining the positions of the cooling fluid openings on the surface of the component or the fastening for the indirect, detachable fastening of the component can be movable. For the purposes of the present invention, direct fastening means that the component is fixed via constituents present in the apparatus which are typically not removed from the apparatus for each operation and directly contact the surface of the component. On the other hand, indirect fastening refers to constituents present in the apparatus to which a holder is fastened, which holder in turn contacts the surface of the component. Such a holder can consist of one or more elements. Despite the additional costs, the use of such a holder and indirect fastening to the apparatus is advantageous for many applications, since it can be taken from the apparatus together with the component. Here, a certain basic orientation position of the component is retained and otherwise labile components can temporarily be provided with a stable bottom element which allows simple switching-off of the components.

In a further aspect, the present invention provides for use of the process of the invention and/or the apparatus of the invention in the production or refurbishment of components of a turbo machine. The term "refurbishment" here encompasses repair work and restoration of components, for example during maintenance operations. Examples of such turbo machines are gas turbines, which are used, inter alia, in an aircraft or a power station, steam turbines and compressors.

In a further aspect, the present invention provides for a use of data of a component which have been obtained in step b) of the process of the invention for producing a corrected model of a component on the basis of existing construction data.

For a more complete understanding of the present invention, reference is made to the following comprehensive description and the figures described in conjunction therewith. However, the figures are to be interpreted merely as clarification of the invention and represent only particularly advantageous embodiments and not a restriction of the invention.

DETAILED DESCRIPTION OF INVENTION

Figure 1:
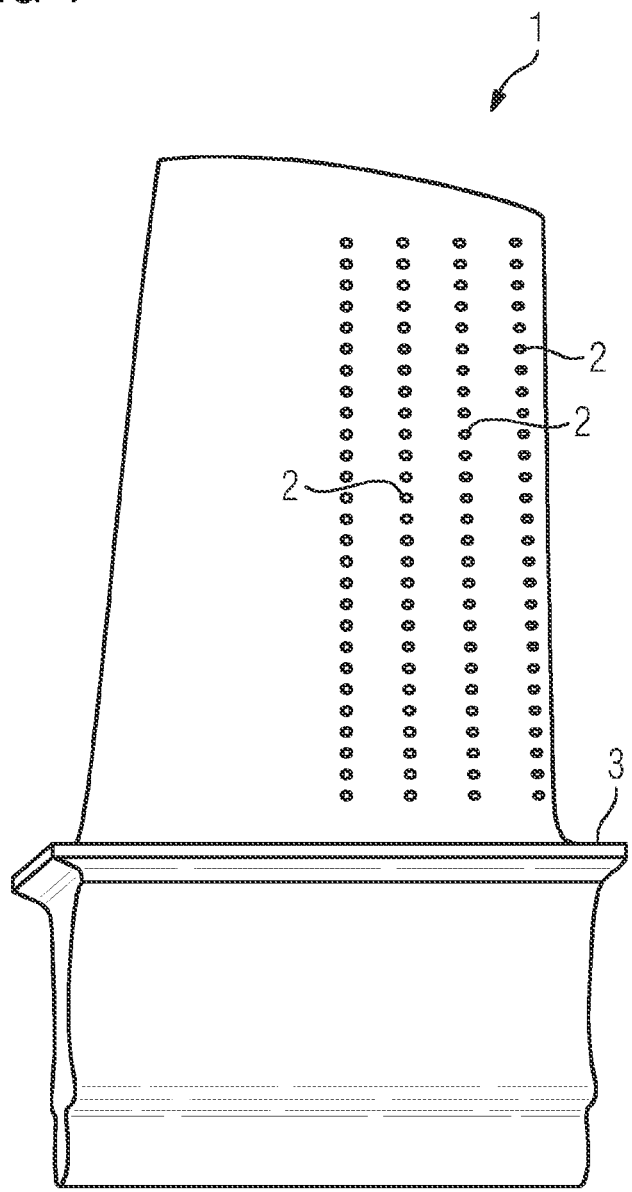
FIG. 1 shows a schematic depiction of a turbine blade, with the cooling fluid openings, which are at least partly closed during a coating process, being readily visible in the upper part.

The process of the invention is, for example, particularly suitable for maintenance processes for constituents of a turbine, a compressor or a combustion chamber which have film cooling. Apart from the increased speed of such maintenance processes, the susceptibility to errors can be significantly reduced since, for example, the actual positions of the openings are determined and utilized for processing. Since a limited possibility of repairs to a corresponding component is typically assumed, the highly precise process of the invention with optimized procedure and improved susceptibility to errors also provides an increase in the life of the component.

The position of the further cooling fluid openings can typically be predicted sufficiently precisely on the basis of interpolation processes and/or construction data. To increase the accuracy of the process further and reduce errors, for example as a result of production fluctuations or high error tolerances in manufacture, advantage can, however, be given to providing a large quantity of measured data. In further embodiments, advantage is typically given to determining the three-dimensional shape of at least 50%, more advantageously at least 70%, even more advantageously at least 80%, of the cooling fluid openings. Furthermore, advantage can be given, in further embodiments, to the three-dimensional shape of at least 95%, more advantageously at least 99%, even more advantageously all, of the cooling fluid openings being determined.

Even when the position of further cooling fluid openings can be determined from the position of a reference opening by means of interpolation using, for example, construction data, determining the position of a large number of cooling fluid openings is typically advantageous. In further embodiments, advantage is therefore given to determining the position of at least 10%, more advantageously at least 30%, even more advantageously at least 60%, of the cooling fluid openings in step b). In particular, advantage is typically given to determining the position of at least 80%, more advantageously at least 99%, even more advantageously 100%, of the cooling fluid openings. The determination of the position of all cooling fluid openings is especially advantageous when no construction data are available or the reliability of the construction data has been doubted.

To provide a particularly quick and highly precise measurement, advantage is given to using different measurement methods in the steps of the two-part surface analysis for typical applications. In further embodiments, advantage is therefore given to carrying out the two parts of the two-part surface analysis using different measuring instruments. Typically, particular advantage is given to the measuring instruments using different measurement methods. For example, a measuring instrument based on laser triangulation methods or strip light projection can be used together with a measuring instrument based on interferometry in order to obtain particularly high-quality measurement results.

In further embodiments, the process of the invention comprises, between step b) and d), an evaluation of the data obtained in step b), with a damaged peripheral region of the at least one cooling fluid opening being corrected if necessary by means of fitting processes in order to obtain the original shape of the at least one cooling fluid opening. This is, for example, particularly advantageous when the data of the cooling fluid channel adjoining the at least one cooling fluid opening are to be obtained by means of interpolation.

It has surprisingly been found that the shape and orientation of a cooling channel adjoining the surface can be determined with high accuracy by means of fitting processes from the exact three-dimensional shape and associated curvatures of the surface and optionally also associated data concerning the initial region of the cooling fluid channel. Although cooling fluid channels can also have complex shapes which cannot be interpolated using a particular distance to the cooling fluid opening, it has been found that the region of the cooling fluid channels directly adjoining the cooling fluid openings can be interpolated sufficiently accurately for the reopening according to the invention of the cooling fluid openings, with this region being sufficient for carrying out highly precise reopening.

In further embodiments, the data obtained in step b) are compared with construction data, such as CAD data, of the component. It has surprisingly been found that comparison with the ideal construction data is typically advantageous. For example, the interpolations for determining the cooling fluid channels can be drastically simplified thereby. Simple assignment of the theoretical data from the construction data to the actually measured data enables, inter alia, usable data from the construction data to be identified and data processing of the measured data for the calculation required as a consequence of the deviations and interpolation to be reduced.

In further embodiments, the comparison of the acquired data with the construction data comprises a plausibility check, with the plausibility check encompassing, in particular, the number and position of the cooling fluid openings and also the shape and orientation of the cooling fluid channels and with a defined action being triggered in the case of significant deviations. A check can also be made, for example, for impermissible deviations in the overall shape of the component. For the purposes of the present invention, the expression "significant deviation" refers to distinct deviations, with a person skilled in the art being able to set down the limits of such a significant deviation on the basis of their general technical knowledge and/or customer specifications. For example, such a person will choose limits which when exceeded would mean that the component no longer satisfies prevailing requirements. Furthermore, a person skilled in the art can, for example, set down upper limits for a deviation which are based on production fluctuations and/or corresponding error tolerances. This makes it possible, for example, to identify erroneously assigned components and, for example, either separate these out automatically or direct them to the attention of employees by means of appropriate feedback. It is also possible, for example, to detect severe damage to the cooling fluid openings, so that affected components can be separated out and optionally repaired before the coating process.

In further embodiments, a corrected model of the component is produced on the basis of data obtained in step b), with existing construction data being corrected. This has typically been found to be particularly advantageous for producing a corrected model of the component on the basis of the measured data. Firstly, existing systems which operate using the construction data and corresponding models can be utilized here. In addition, it allows, in particular, the actual shape of the corresponding component to be recorded. This allows, for example, recording of the change in the components over the course of time. These data can in turn be utilized for optimizing the components. Furthermore, it makes unambiguous identification of the components possible, which can, for example, be relevant in the case of future compensation claims.

In further embodiments, a simplified model of the component is produced on the basis of the data obtained in step b). Here, the simplified model encompasses the positions of the cooling fluid openings and also information concerning the cooling fluid openings. The information concerning the cooling fluid openings can, for example, encompass the shape of the cooling fluid openings and also the shape and orientation of the adjoining cooling fluid channels. For example, the external shape of the component or the coordinate system of the apparatus can serve as basis for this model. This allows, in particular, processing without knowledge of the original construction data. Furthermore, the calculation operations are significantly reduced, so that, for example, facilities having a relatively low calculation power can be used for this purpose. Although, for example, fewer data for a long-term observation of changes in the component can be obtained therewith, this has been found to be typically sufficient, as long as only the cooling fluid openings and cooling fluid channels of the component are the focus of attention.

In further embodiments, the component is firstly rotated for rapid determination of the position of the cooling fluid openings on the surface of the component, before the three-dimensional shape of the at least one cooling fluid opening is determined in a targeted manner. It is typically advantageous for a determination of the position of the cooling fluid openings firstly to be carried out before the shape of the at least one cooling fluid opening is determined. In particular, this simplifies the process because the typically significantly different speeds of the two parts of the surface analysis do not interfere with one another.

In further embodiments, advantage is given, on the other hand, to the general measurement of the surface and the precise measurement of the cooling fluid openings being carried out at least partly simultaneously. Although such a procedure is more complex, a particularly time-efficient procedure, for example, can be achieved thereby. Thus, for example, the component can be rotated in the interior of the apparatus while the imprecise general measurement of the surface is carried out on one side while the cooling fluid openings on the surface previously discovered during the course of the rotation are precisely measured at a previously measured position. This can, for example, be advantageous when comparable components are to be processed in succession. The resulting time gain in the surface analysis can here compensate for the additional time and work required for the specifically adapted procedure for the surface analysis.

In further embodiments, at least one cooling fluid opening is selected as reference point after measurement of the surface and the position of the cooling fluid openings, advantageously employing the construction data. Here, in particular, the position and determinability of the precise position of the cooling fluid opening and also of the adjoining channel is taken into account. Deviations from the ideal geometry are advantageously also taken into account here and, for example, damaged cooling fluid openings are less advantageously selected as reference point. Apart from the actual use of the reference opening as reference point for the interpolation of further cooling fluid openings, such a reference opening can also be utilized, for example, for quality control and comparison with the conception data.

In further embodiments, the position of the cooling fluid openings and the three-dimensional shape of the at least one cooling fluid opening are determined using different measuring apparatuses. For typical applications, it has been observed that the use of different measuring apparatuses which are operated with different resolutions instead of, for example, one measuring apparatus typically enables more precise results to be obtained. Measurement methods such as rotation laser triangulation and measurement methods based on interferometry have been found to be advantageous for typical applications. For example, rotation laser triangulation can be used for determining the position of the cooling fluid openings, while an interferometer is utilized for determining the shape of the at least one cooling fluid opening.

In further embodiments, the position of the cooling fluid openings and the three-dimensional shape of the at least one cooling fluid opening are determined using the same measuring apparatus. It can be advantageous to use different measuring apparatuses in order to carry out the two parts of the surface scan in many applications, since more accurate data are typically obtained in this way. However, use of the same measuring apparatus for both measurements can be advantageous in order to provide a particularly simply constructed apparatus. In particular, a typically significantly different resolution of the measuring apparatus is utilized here for the two parts of the surface analysis. For example, the space requirement for the apparatus can be remembered thereby or, at the same space requirement, room can be provided within the apparatus for integrating-in further functions. It has surprisingly been found that sufficient measurement data to be able to restore the cooling fluid openings with sufficient accuracy can typically be obtained in this way.

Furthermore, it has typically been found to be advantageous to store the acquired measured data or data produced therefrom. For example, storage can be carried out here on a transportable storage medium or a storage unit integrated into a network. The transportable storage unit can, for example, subsequently be connected to the other apparatus for opening the cooling fluid openings or the corresponding apparatus can retrieve the acquired data from the storage unit integrated into the network via a network connection. If subsequent processing steps are also to be carried out in the same apparatus, is has typically been found to be advantageous to store the data externally. For example, increased data security can be assured in this way and even in the case of damage to the apparatus between, in particular, the inventive steps and subsequent steps, the data can be used for an apparatus used as a substitute.

In further embodiments, a damaged peripheral region of the at least one cooling fluid opening is corrected by means of fitting processes in the evaluation of the data in step c) in order to obtain the ideal shape of the at least one cooling fluid opening and also the position and the ideal shape and orientation of the adjoining cooling fluid channel. Here, the expression ideal shape and orientation is used to refer to the origins of an unintended shape and orientation of the corresponding constituents which are to be achieved as a consequence of the original construction. Deviations therefrom typically result from production fluctuations, error tolerances or damage.

In further embodiments, the process of the invention comprises a step e) after step d), wherein e) the component is, after removal of the coating in the region of the cooling fluid opening, once again subjected to a surface analysis in an apparatus according to the invention, advantageously the apparatus. This allows, for example, quality control which is of particular interest for highly stressed components as are installed in the flow channel of a turbo machine, for example in the turbine blades. A model of the finished component or the refurbished component can also be produced and stored in order to answer subsequent questions, giving the customer evidence of achievement of the desired specification or to correlate subsequent observations during operation with the real shape of the component.

The apparatus of the invention and/or the process of the invention, as set forth above, can particularly advantageously be used in the production or refurbishment of components of a turbo machine.

In principle, the component can, in particular, be any component provided with cooling fluid openings in a turbo machine. Examples of turbo machines of this type are steam turbines and gas turbines. In further embodiments, the component is selected from the group consisting of blades and heat shields of a turbo machine. For example, the component can be a guide vane or rotor blade. Such guide vanes and rotor blades are found, for example, in the turbine unit of steam turbines and gas turbines or else in the compressor unit of gas turbines, which represent a turbo machine. Such components are subjected to particularly high stresses. Accordingly, regular maintenance comprising removal of an existing coating and application of a new coating is required. Such components and also corresponding processes accordingly profit particularly from the process of the invention and use of the apparatus of the invention in respect of these components.

Components of this type are typically made at least partly of alloys which are resistant to high temperatures, for example iron-, nickel- or cobalt-based superalloys. Such superalloys are known, for example, from EP 1 204 776 B1, EP 1 306 454, EP 1 319 729 A1, WO 99/67435 or WO 00/44949. For example, nickel superalloys are frequently used since these are advantageous for many applications. Here, advantage is also given to the corresponding components being monocrystalline (SX structure).

The manufacture of such monocrystalline workpieces is carried out, for example, by directional solidification of the melt. These methods are casting processes in which the liquid metallic alloy solidifies to give a monocrystalline structure, i.e. the monocrystalline workpiece, or directionally.

Here, dendritic crystals are aligned along the heat flow and form either a rod-like crystalline grain structure (columnar, i.e. grains which extend over the entire length of the workpiece and are here, in accordance with general language usage, referred to as directionally solidified) or a monocrystalline structure, i.e. the entire workpiece consists of a single crystal. In these processes, the transition to globulitic (polycrystalline) solidification has to be avoided since transverse and longitudinal grain boundaries are necessarily formed by nondirectional growth, which negates the good properties of the directionally solidified or monocrystalline component.

The expression directionally solidified microstructures is generally employed to mean both single crystals, which have no grain boundaries or at most small-angle grain boundaries, and also columnar crystal structures which do have grain boundaries running in the longitudinal direction but no transverse grain boundaries. This second type of crystalline structures is also referred to as directionally solidified structures.

Such processes are known from U.S. Pat. No. 6,024,792 and EP 0892090 A1.

Likewise, the components can have coatings to protect against corrosion or oxidation, e.g. (MCrAlX; M is at least one element from the group consisting of iron (Fe), cobalt (Co), nickel (Ni), X is an active element and is yttrium (Y) and/or silicon and/or at least one element of the rare earths, or hafnium (Hf)). Such alloys are known from EP 0486489 B1, EP 0786017 B1, EP 0412397 B1 or EP 1306454 A1.

The density is advantageously 95% of the theoretical density.

A protective aluminum oxide layer (TGO—thermally grown oxide layer) is formed on the MCrAlX layer (as intermediate layer or as outermost layer).

The layer advantageously has the composition Co-30Ni-28Cr-8Al-0.6Y-0.7Si or Co-28Ni-24Cr-10Al-0.6Y. Apart from these cobalt-based protective coatings, nickel-based protective coatings such as Ni-10Cr-12Al-0.6Y-3Re or Ni-12Co-21Cr-11Al-0.4Y-2Re or Ni-25Co-17Cr-10Al-0.4Y-1.5Re are also advantageously used.

A thermal barrier coating can additionally be present on the MCrAlX and is advantageously the outermost layer and consists, for example, of $ZrO_2$, $Y_2O_3$—$ZrO_2$, i.e. it is not stabilized, partially stabilized or completely stabilized by yttrium oxide and/or calcium oxide and/or magnesium oxide.

The thermal barrier coating covers the entire MCrAlX layer.

Rod-shaped grains are produced in the thermal barrier coating by suitable coating methods such as electron beam vaporization (EB-PVD).

Other coating processes are conceivable, e.g. atmospheric plastic spraying (APS), LPPS, VPS or CVD. The thermal barrier coating can have porous grains or grains having microcracks or macrocracks to provide better thermal shock resistance. The thermal barrier coating is thus advantageously more porous than the MCrAlX layer.

Restoration (refurbishment) means that components may have to be freed of protective layers after use (e.g. by sand blasting). This is followed by removal of the corrosion and/or oxidation layers or products. Cracks or other damage in the component may also be repaired. This is followed by recoating of the component in order to allow renewed use of the component.

The apparatuses of the invention are particularly suitable for the surface analysis of components which are used in turbo machines and are exposed to the stream of the fluid used therein. It has surprisingly been found that the apparatuses of the invention with, inter alia, the possibility of two-part surface analysis with minimal outlay and at maximum speed can provide the data required for such cases.

For many applications, advantage is typically given to the apparatuses of the invention having at least two measuring devices. Although this increases the outlay in the provision of the apparatus, it has surprisingly been found that this additional outlay is more than compensated for by, for example, the increased speed in synchronous measurements on different sizes of the component. For example, it has approximately been found that the time gain achieved in the process of the invention is particularly relevant, since it enables the time loss caused by the two-part surface analysis to be compensated for and the overall efficiency of the process is significantly increased. The use of different measuring devices has been found to be surprisingly advantageous for the process of the invention.

In further embodiments, the apparatus has a movable measuring device, with the movable measuring device having a robotic arm. This has been found to be particularly advantageous when, for example, complex shapes are to be measured on components, for example blades, in particular guide vanes and rotor blades. It is here also possible for a highly precise analytical unit to be particularly simply bent or brought against the component which is to be measured. Advantage is typically given to the measuring device for determining the three-dimensional shape of the at least one cooling fluid opening being movable.

In further embodiments, the apparatus has a movable measuring device and the movable measuring device can be tilted by at least 10°, more advantageously at least 20°, even more advantageously at least 25°. It has been found that even the possibility of tilting the analytical unit by such small angles allows significantly more flexible and accurate analysis. In particular, in view of, for example, the orientation of the cooling fluid channels which adjoin the cooling fluid opening, better orientation of the analytical unit can be obtained here, so that the measured results have a significantly greater accuracy. For example, the measuring device can be tilted at least partly in the direction of the cooling fluid channel in order to measure a larger part of the initial region of the cooling fluid channel.

In further embodiments, the apparatus provides different measuring devices for the two parts of the surface analysis. The provision of different measuring devices which are adapted to the respective measurement, in particular by use of different measurement methods, has been found to be particularly advantageous for providing high-quality data.

In further embodiments, the apparatus provides at least one measuring device which can be operated in different modes and is suitable for carrying out both parts of the surface scan in succession. This allows, for example, the provision of particularly simply constructed and inexpensive apparatuses according to the invention.

In further embodiments, the position of the cooling fluid openings and the three-dimensional shape of the at least one cooling fluid opening is determined by means of the same measuring device. Although it can for many applications be advantageous to use different measuring devices to carry out the two measurements, since more accurate data are typically obtained here, the use of the same measurement method for both measurements can be advantageous in order to provide a particularly simply constructed apparatus. For example, the space requirement of the apparatus can be remembered thereby or, for the same space requirement, room can be provided within the apparatus to integrate-in further functions. It has surprisingly been found that sufficient measured data in order to be able to restore the cooling fluid openings with sufficient accuracy can typically be obtained in this way.

In further embodiments, the at least one fastening of the apparatus is movable and the movable fastening is suitable for providing a rotation of the component through at least 270°.

This apparatus has typically been found to be particularly advantageous since complete measurement of the component can be carried out even with a small possible movement of the sensor unit. For example, a possible movement of the analytical unit for determining the positions of the cooling fluid openings can theoretically be dispensed with in at least 2 axes or entirely by provision of rotation by at least 360°. For example, it can then in these cases be sufficient for the analytical unit to be able to move along a rail on which the analytical unit is moved up and down while the component is rotated in front of it. Particularly in the case of sensitive analytical units, for which unnecessary movements should be avoided, this has been found to be particularly advantageous.

The inventive use of the data obtained in step b) of the process of the invention for producing a corrected model on the basis of existing construction data makes it possible, for example, to obtain a model of the component actually present, with production fluctuations and deviations resulting from error tolerances being corrected by the measurement. This is, for example, advantageous for simulations in which, for example, the life of the component under various conditions is simulated on the basis of the model.

Furthermore, this is advantageous, for example, for incoming goods monitoring of prefabricated components or for optimized automated processing and/or maintenance of such components. Owing to production errors and/or error tolerances, actual components typically deviate at least minimally from the theoretical construction data. Owing to the requirements which have increased in recent years, slight deviations have, particularly for subsequent maintenance work or optimized simulation processes in which, for example, the life of a component is predicted with high accuracy, increased steadily. Since highly relevant information on the real nature of the component, from which further features can in turn be deduced, can be obtained by means of the process of the invention and/or using the apparatus of the invention with simple means, this has been found to be particularly advantageous.

The corrected model is advantageously suitable for making automated opening of the cooling fluid openings after coating of the component possible. An apparatus according to the invention, for example, can be used for this purpose.

The invention will be described in detail below with the aid of individual figures. Here, it should be pointed out that the figures are to be understood as being purely schematic and that no lack of ability to perform the invention can be derived therefrom. In particular, they should not be interpreted as restricting the invention, the scope of which is specified only by the claims.

Furthermore, it may be pointed out that the technical features presented below are intended to be claimed in any combination with one another as long as the object of the invention can be achieved by this combination.

FIG. 1 schematically shows the outside of a turbine blade 1 as example of the component comprising a plurality of cooling fluid openings 2 which adjoin the cooling channels of the turbine blade 1. During the course of a repair process, the coating present on the turbine blade 1 is removed, damage is repaired and the turbine blade 1 is coated again. During the course of a production process, the removal of an existing coating is naturally omitted if the component does not have to be subjected to the process again as a result of defective processing.

The coating is typically applied to the region above the platform 3 since this region is exposed to the fluid stream during operation of, for example, a gas turbine. The part below the platform 4 is not exposed to the fluid stream and can therefore be used without the additional protective coating. The formation of the lower part allows reliable fixing of the component, for example to the rotor of a gas turbine. Owing to the insufficient base area, the component has to be fixed during the processing steps. This can, for example, be effected by means of a mobile holder which mechanically grips the region of the turbine blade 1 below the platform 3 and itself is fastened to a fastening in the apparatus of the invention.

Figure 2:
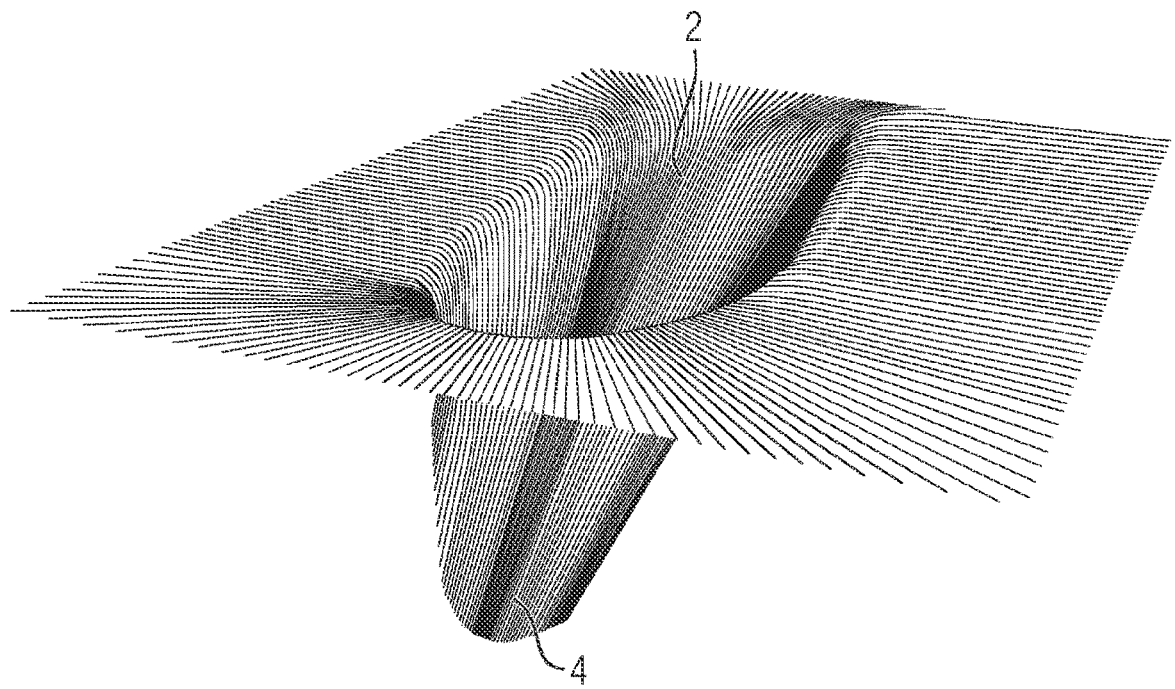
FIG. 2 schematically shows the three-dimensional shape of a cooling fluid opening, which was determined in step b) of the process of the invention.

FIG. 2 shows a high-resolution scan of a cooling fluid opening 2 which adjoins a cooling fluid channel of the turbine blade 1 depicted in FIG. 1. Here, the three-dimensional shape of the cooling fluid opening 2, which is adjoined by the initial region 4 of the cooling fluid channel, can readily be seen, and the cooling fluid channel adjoining this opening can also be interpolated sufficiently accurately.

The irregularities in the surface resulting from measurement inaccuracies and/or damage to the surface of a cooling fluid opening 2 which are able to be observed here can be removed, for example, by means of fitting methods.

Figure 3:
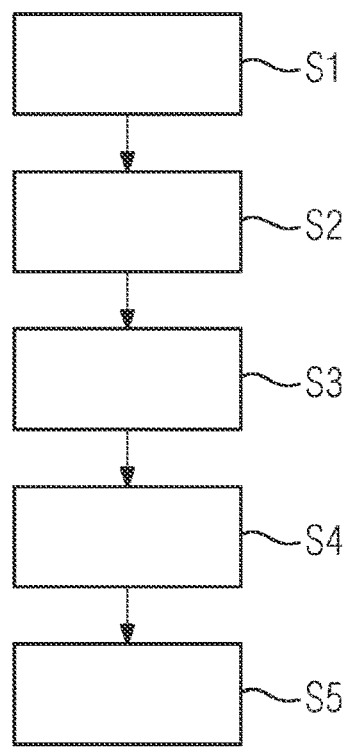
FIG. 3 shows a flow diagram of a process according to the invention.

FIG. 3 shows a flow diagram of the process of the invention.

In 51, the component, for example the turbine blade 1 depicted in FIG. 1, is introduced into an apparatus according to the invention as per step a) of the process of the invention.

For this purpose, the apparatus comprises at least one measuring device and at least one fastening. A holder, for example, can be fastened to the fastening, and this holder in turn clamps the lower part of the turbine blade 1 depicted in FIG. 1. The turbine blade 1 is thus indirectly, detachably fixed in the apparatus during the process of the invention.

In step S2, data in respect of the position of the cooling fluid openings 2 on the surface of the component and also the three-dimensional shape of at least one cooling fluid opening are provided. The determination of the data can here be carried out by means of the same measuring device or by means of different measuring devices. The use of different measuring devices allows, for example, the parallel determination of the data in respect of the position of the cooling fluid openings and also the three-dimensional shape of the at least one cooling fluid opening. One of the two measuring devices here is suitable for carrying out a large-area surface analysis in which the positions of the cooling fluid openings 2 are determined. For example, a measuring device which operates by means of rotation laser triangulation can be used here. The other of the two measuring devices is suitable for determining the three-dimensional shape of the cooling fluid openings 2. For example, a measuring device based on interferometry can be used for this purpose. Here, the measuring device for determining the three-dimensional shape of the at least one cooling fluid opening 2 can, for example, be fastened to a robotic arm which provides high mobility of the measuring device. To improve the data in respect of the three-dimensional shape of the at least one cooling fluid opening 2, the corresponding measuring device can, for example, be oriented at least partly in the direction of the adjoining cooling fluid channel in order to obtain more relevant data.

As an alternative, it is also possible to utilize an apparatus according to the invention which uses the same measuring device for both parts of the surface analysis. For example, a quick measurement with low resolution is firstly carried out in order to determine the positions of the cooling fluid openings 2, before the three-dimensional shape of the at least one cooling fluid opening 2 is determined with high resolution. This allows a significantly simpler structure of the apparatus, but less detailed information is typically obtained.

Since the time requirement of the two parts of the surface scan is typically different, advantage can be given to the two parts being carried out separately from one another in order to provide a generally applicable process. For example, rapid rotation of the component with determination of the position of cooling fluid openings 2 is firstly performed. Subsequently, the exact three-dimensional shape of the at least one cooling fluid opening 2 is determined with further rotation of the component.

The measuring device is optionally fastened to a robotic arm for accurate measurement of the cooling fluid openings 2. This allows optimal positioning of this measuring device in order to obtain high-quality measured data for the cooling fluid openings 2. Furthermore, a further improvement can be achieved by synchronous movement corresponding to the rotation of the component, in particular in a synchronized measurement process using different measuring devices.

Typically, it is at least advantageous that the measuring device offers the possibility of being tilted by at least 10° for exact measurement of the at least one cooling fluid opening 2. This allows adaptation of the orientation of the measuring device in order, for example, to measure a larger part of the cooling fluid channel adjoining the cooling fluid opening 2.

After this analysis step, the turbine blade 1 can be taken from the apparatus of the invention, for example in order to carry out optional processing steps and/or apply the coating. If the apparatus of the invention is suitable for the purpose, such steps can naturally also be carried out in this.

In step S3, a coating is applied to the component, with the cooling fluid opening 2 being at least partly closed. Typically, a ceramic coating which typically increases the heat resistance particularly advantageously is advantageously applied. This can be applied by means of known methods.

In step S4, the coating is removed in the region of the cooling fluid opening. The removal of the coating can, for example, be carried out using a drilling laser or other suitable drills. Here, precise removal of the coating can be carried out by means of the data obtained in step S2, so that the planned cooling is restored.

In an optional step S5, a measurement by means of the measuring device according to the invention can again be carried out in a manner analogous to S2 after removal of the coating in the region of the at least one cooling fluid opening 2 in step S4. However, it is also possible, for example, to determine only the three-dimensional shape of one or more specific cooling fluid openings 2. On the basis of these data, a quality control of the processing can be carried out in automated fashion and, in particular, defects and/or damage in the coating, especially in the region of the cooling fluid opening 2, can be detected.

If the data obtained in the optional step S5 or in another alternative testing step indicate defects in the coating or the removal of the coating material in the region of the cooling fluid openings 2, the component can subsequently be subjected once again to the process of the invention. For example, the process can start again from 51 after removal of the coating outside the apparatus of the invention. As an alternative or in addition, a quality control can, for example, also be carried out by means of a transmission test in order to test unimpeded flow of the cooling medium through the cooling fluid channels.

As an alternative or in addition to this, comparison of the acquired data with the construction data, for example CAD data, for the component can be carried out in step S5. Here, relevant changes can also be recognized in automated fashion and, for example, be transmitted to an expert for checking.

As an alternative or in addition, a corrected model of the component can be produced in step S5. Here, a corrected model of the actual component is produced on the basis of existing construction data with comparison with the measured data for the at least one cooling fluid opening 2 and the adjoining cooling fluid channels. This model can also be simplified by, for example, only data which are absolutely necessary, for example the external shape or prominent parts of the external shape, and also the relative position of the at least one cooling fluid opening 2 and also the associated information being recorded.

The present invention has been described in more detail for explanatory purposes with the aid of working examples. However, the invention is not intended to be restricted to the specific configuration of these working examples. Rather, the scope of protection of the invention is restricted only by the accompanying claims.

The invention claimed is:

1. A process for coating a component comprising a surface comprising cooling fluid openings which adjoin cooling fluid channels in the interior of the component, the process comprising:
   a) introducing the component into an apparatus for a surface analysis of the component, where the apparatus comprises at least one measuring device and a fastening, where the fastening is suitable for being connected detachably either directly or indirectly to the component, where the apparatus is configured to carry out a two-part surface analysis, wherein in a first part of the two-part surface analysis the at least one measuring device is configured to determine a position of the cooling fluid openings on the surface of the component, and in a second part of the two-part surface analysis the at least one measuring device is configured to determine a three-dimensional shape of at least one cooling fluid opening,
   b) carrying out of the surface analysis of the component, where data in respect of the position of the cooling fluid openings on the surface of the component and in respect of the three-dimensional shape of at least one cooling fluid opening are detected,
   c) applying a coating to the component, where the cooling fluid openings are at least partly closed, and
   d) removing the coating in a region of the cooling fluid openings;
   wherein the at least one measuring device comprises: a first measuring device configured to determine the position of the cooling fluid openings on the surface of the component; and a second measuring device configured to determine the three-dimensional shape of at least one cooling fluid opening, and
   wherein the first measuring device and the second measuring device are different from each other.

2. The process as claimed in claim 1,
   wherein the first measuring device is configured to determine of the position of the cooling fluid openings on the surface of the component by means of a first measurement method, wherein second measuring device is configured to determine the three-dimensional shape of at least one cooling fluid opening by a second measurement method, and
   wherein the first measurement method and the second measurement method are different from each other.

3. The process as claimed in claim 1,
   wherein the determination of the position of the cooling fluid openings on the surface of the component is carried out by means of rotation laser triangulation and the three-dimensional shape of at least one cooling fluid opening is determined by means of an interferometer.

4. The process as claimed in claim 1,
   wherein the three-dimensional shape of at least 50% of the cooling fluid openings is determined.

5. The process as claimed in claim 1,
   wherein the component is selected from the group consisting of blades and heat shields of a turbo machine.

6. The process as claimed in claim 1, further comprising, between step b) and d), evaluating the data of the surface analysis of the component obtained in step b) in order to produce a data set comprising information in respect of the position, shape and orientation of the cooling fluid channels adjoining the cooling fluid openings.

7. The process as claimed in claim 1, further comprising, between step b) and d), evaluating the data obtained in step b), and determining a damaged peripheral region of at least one cooling fluid opening exists;
using curve fitting processes in order to obtain an undamaged shape of the peripheral region of the at least one cooling fluid opening; and
correcting the damaged peripheral region.

8. The process as claimed in claim 1, wherein the data obtained in step b) are compared with construction data of the component.

9. The process as claimed in claim 1, wherein a corrected model of the component is produced on the basis of the data obtained in step b), with existing construction data being corrected.

10. The process as claimed in claim 1, wherein the cooling fluid openings are completely closed when applying the coating to the component.

11. The process as claimed in claim 1, wherein the measuring device is a light-based measuring device.

12. A method for production or refurbishment of components of a turbo machine, the method comprising:
coating a component according to the process of claim 1.

13. An apparatus for a surface analysis of a component comprising a surface comprising cooling fluid openings which adjoin cooling fluid channels in the interior of the component, the apparatus comprising:
a measuring device and a constituent connector that is a constituent of the apparatus and that is configured to connect to the component or to connect to a holder of the component, wherein the fastening is suitable for being connected detachably either directly or indirectly to the component, where the apparatus is configured to carry out a two-part surface analysis, wherein in a first part of the surface analysis the measuring device is configured to determine a position of the cooling fluid openings on the surface of the component via a first measuring device, and in a second part of the surface analysis the measuring device is configured to determine a three-dimensional shape of at least one cooling fluid opening via a second different measuring device, and
where at least one element from the group consisting of the measuring device and the constituent connector is movable;
wherein the apparatus is adapted to perform the process of claim 1.

14. The apparatus as claimed in claim 13,
wherein the measuring device comprises a robotic arm.

15. The apparatus as claimed in claim 13,
wherein the measuring device is operable in different modes and is suitable for carrying out both parts of the surface analysis in succession.

16. The apparatus as claimed in claim 13,
wherein the constituent connector is movable and is suitable for providing rotation of the component by at least 270°.

17. A process for coating a component comprising a surface comprising cooling fluid openings which adjoin cooling fluid channels in the interior of the component, the process comprising:
a) introducing the component into an apparatus for a two-part surface scan of the component, where the apparatus comprises at least one scanning device, where the apparatus is configured to carry out a two-part surface scan, wherein in a first part of the two-part surface scan the at least one measuring device is configured to determine a position of the cooling fluid openings on the surface of the component using a first measurement method, and in a second part of the two-part surface scan the at least one measuring device is configured to determine a three-dimensional shape of at least one cooling fluid opening using a second measurement method that is different than the first measurement method,
b) carrying out of the two-part surface scan of the component, where data with respect to the position of the cooling fluid openings on the surface of the component and with respect to the three-dimensional shape of at least one cooling fluid opening are detected,
c) applying a coating to the component, where the cooling fluid openings are at least partly closed, and
d) removing the coating in a region of the cooling fluid openings.

18. The process of claim 17, wherein the at least one measuring device comprises: a first measuring device configured to use rotation laser triangulation as the first measurement method; and a second measuring device configured to use an interferometer for the second measurement method.

* * * * *